Patented Jan. 13, 1953

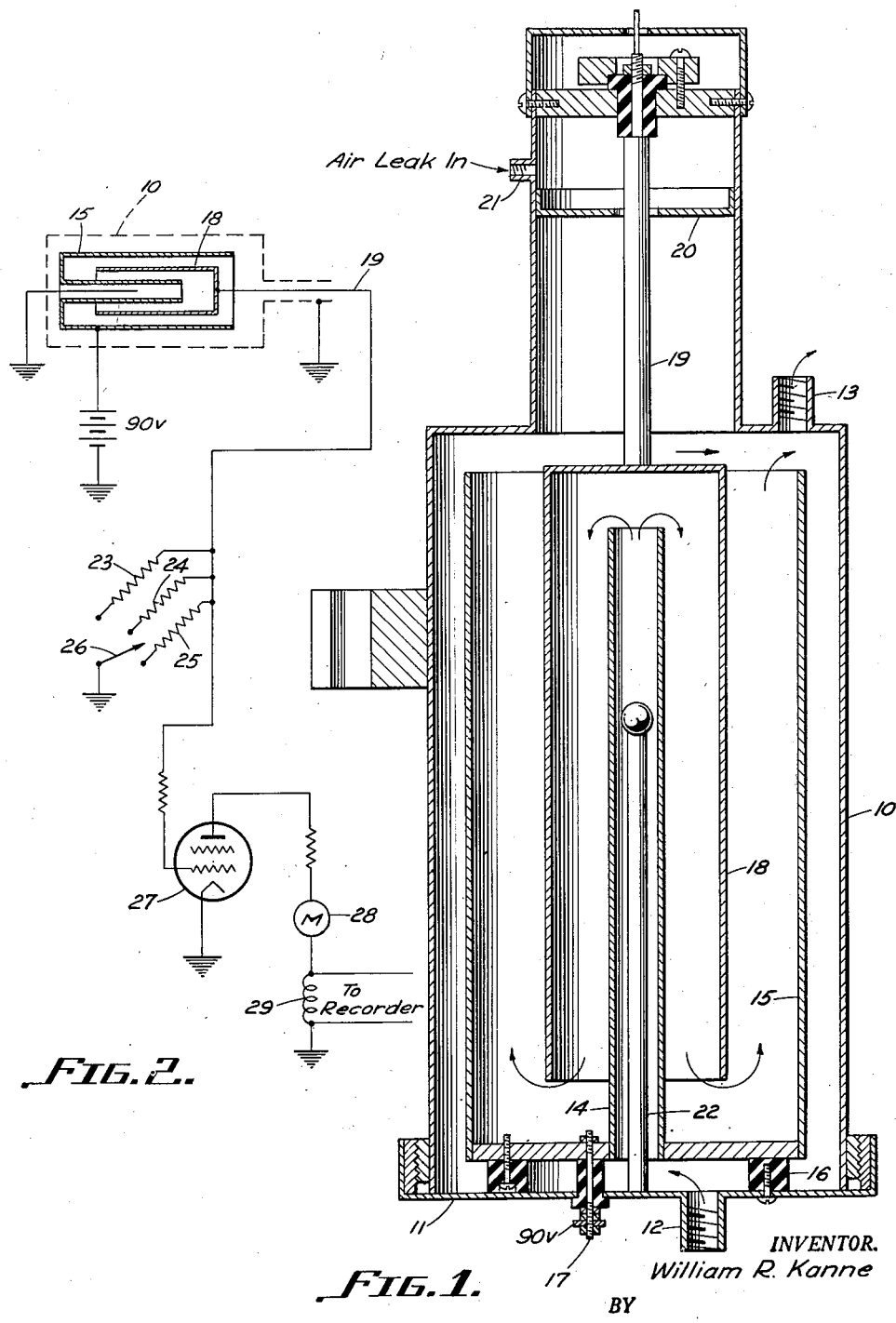

2,625,657

UNITED STATES PATENT OFFICE 2,625,657

MONITORING GAS FOR RADIOACTIVE XENON

William Rudolph Kanne, Richland, Wash., assignor to the United States of America as represented by the United States Atomic Energy Commission Application November 28, 1945, Serial No. 631,413

8 Claims. (Cl. 250—83.6)

The present invention relates to the detection of radioactivity in gases and particularly to the monitoring for radioactive xenon of gases evolved from the chemical treatment of radioactive materials.

The primary object of the present invention is the provision of an apparatus for determining the radioactivity of gases evolved in the chemical treatment of radioactive materials.

Another object of the invention is to assure that the gas being monitored does not contain any ions when it enters the measuring apparatus.

Other objects and advantages of the invention will become evident from the following description when read in connection with the accompanying drawing in which Fig. 1 is an elevation in section of a preferred form of ionization chamber, and Fig. 2 shows schematically a circuit suitable for use with the chamber.

The ionization chamber shown in the drawing comprises a cylindrical outer shell 10 having in its bottom face 11 an inlet opening 12 and near its top an outlet opening 13. Two concentric cylindrical high voltage electrodes 14 and 15 are supported on the bottom face 11 by an annular insulating member 16. These electrodes 14 and 15 connect with a terminal 17 which extends through and is insulated from the bottom face 11. A cylindrical member 18 depending between the electrodes 14 and 15 constitutes a collecting electrode and is supported by a rod 19 suitably mounted in and insulated from the upper reduced portion of the container 10. This rod 19 passes in spaced relation through a baffle 20 separating an air inlet opening 21 from the main chamber 10 so that when gas is drawn through the chamber 10, i. e., entering through opening 12 and discharging through opening 13, air will be drawn in through the opening 21 and around the rod 19 to prevent condensation of electrolytic material on the rod 19. The upper end of the rod 19 leads to a suitable amplifier as will be described in connection with Fig. 2. In accordance with an important feature of the invention a grounded metal rod 22 extends centrally into the high voltage electrode 14. Since the rod 22 is at ground potential, and since incoming gas entering at inlet 12 passes through the interior of the high voltage electrode 14, any ions present in the incoming gas will be swept to ground as the gas passes upwardly within the electrode 14, and this will occur prior to their entry into the part of the chamber where they would appear in the measurement.

This feature of sweeping the incoming ions to ground rather than to the collecting electrode is not limited to the arrangement shown. For example, the entrance openings through the outer shell and the high voltage shell in the chamber shown in my copending application Ser. No. 558,450 filed October 12, 1944, issued on June 10, 1952 as U. S. Patent No. 2,599,922, could be displaced so as to force the incoming gas to pass through a region which would sweep ions to ground. Such an arrangement avoids the use of an electrical precipitator per se.

In the circuit arrangement shown in Fig. 2 the collecting electrode 18 is connected to ground through any one of several resistances 23, 24 and 25 selected by a switch 26. A straight forward current amplifier indicated by a tube 27 is actuated by the voltage drop across the selected input resistor 23, 24, or 25. The output of the amplifier tube 27 may energize a meter 28 for indicating the activity of the gas passing through the chamber 10 and may also energize the input coil 29 of a recording device for suitably recording the activity.

It will be evident from the drawing that the present structure provides a tortuous passage, as indicated by arrows, between the high voltage electrode and the collecting electrodes 14 and 15.

It is to be understood that the invention is not limited to the particular embodiment illustrated and described but is of the scope of the appended claims.

I claim:

1. An ionization chamber for monitoring the activity of a gas passing therethrough including a first electrode and a second electrode in insulated spaced relation, a source of direct voltage, a connection from one side of said source to said first electrode, a connection from the other side of said source to ground, a high resistance, a connection from one side of said resistance to said second electrode, and a connection from the other side of said resistance to ground, said first electrode having a surface over which gas must pass on its way to the space between said electrodes, and a directly grounded conducting member extending along and spaced from a substantial portion of said surface.

2. An ionization chamber for monitoring the activity of a gas passing therethrough comprising two concentric cylindrical electrodes insulated from one another, the first of said electrodes having one end open, and the other end closed except for a re-entrant tubular portion open at both ends and extending inwardly for a substantial portion of the length of said first electrode, said second electrode having one end open and the other end closed and being disposed radially intermediate said re-entrant portion and the outer portion of said first electrode such that the closed end of said second electrode lies adjacent the inner extremity of said re-entrant portion, and the open end of said second electrode lies adjacent the closed end of said first electrode, whereby gas forced inwardly into said re-entrant portion is caused to flow first in one direction through the interior of said re-entrant portion, then in the opposite direction between the exterior surface of said re-entrant portion and the interior surface of said second electrode, and then again in the original direction between the exterior surface of said second electrode and the interior surface of said first electrode.

3. An ionization chamber for monitoring the activity of a gas passing therethrough comprising two concentric cylindrical electrodes insulated from one another, the first of said electrodes having one end open, and the other end closed except for a re-entrant tubular portion open at both ends and extending inwardly for a substantial portion of the length of said first electrode, said second electrode having one end open and the other end closed and being disposed radially intermediate said re-entrant portion and the outer portion of said first electrode such that the closed end of said second electrode lies adjacent the inner extremity of said re-entrant portion, and the open end of said second electrode lies adjacent the closed end of said first electrode, whereby gas forced inwardly into said re-entrant portion is caused to flow first in one direction through the interior of said re-entrant portion, then in the opposite direction between the exterior surface of said re-entrant portion and the interior surface of said second electrode, and then again in the original direction between the exterior surface of said second electrode and the interior surface of said first electrode, and an outer concentric cylindrical casing substantially surrounding said first electrode and insulated therefrom, said casing having a gas inlet opening adjacent one end of said first electrode and a gas outlet opening adjacent the other end of said first electrode.

4. An ionization chamber for monitoring the activity of a gas passing therethrough comprising two concentric cylindrical electrodes insulated from one another, the first of said electrodes having one end open, and the other end closed except for a re-entrant tubular portion open at both ends and extending inwardly for a substantial portion of the length of said first electrode, said second electrode having one end open and the other end closed and being disposed radially intermediate said re-entrant portion and the outer portion of said first electrode such that the closed end of said second electrode lies adjacent the inner extremity of said re-entrant portion, and the open end of said second electrode lies adjacent the closed end of said first electrode, whereby gas forced inwardly into said re-entrant portion is caused to flow first in one direction through the interior of said re-entrant portion, then in the opposite direction between the exterior surface of said re-entrant portion and the interior surface of said second electrode, and then again in the original direction between the exterior surface of said second electrode and the interior surface of said first electrode, a source of direct voltage, a connection from one side of said source to said first electrode, a connection from the other side of said source to ground, a high resistance, a connection from one side of said resistance to said second electrode, and a connection from the other side of said resistance to ground.

5. An ionization chamber for monitoring the activity of a gas passing therethrough comprising two concentric cylindrical electrodes insulated from one another, the first of said electrodes having one end open, and the other end closed except for a re-entrant tubular portion open at both ends and extending inwardly for a substantial portion of the length of said first electrode, said second electrode having one end open and the other end closed and being disposed radially intermediate said re-entrant portion and the outer portion of said first electrode such that the closed end of said second electrode lies adjacent the inner extremity of said re-entrant portion, and the open end of said second electrode lies adjacent the closed end of said first electrode, whereby gas forced inwardly into said re-entrant portion is caused to flow first in one direction through the interior of said re-entrant portion, then in the opposite direction between the exterior surface of said re-entrant portion and the interior surface of said second electrode, and then again in the original direction between the exterior surface of said second electrode and the interior surface of said first electrode, a source of direct voltage, a connection from one side of said source to said first electrode, a connection from the other side of said source to ground, a high resistance, a connection from one side of said resistance to said second electrode, and a connection from the other side of said resistance to ground, and a grounded outer concentric cylindrical casing disposed around said first electrode and insulated therefrom and having gas inlet and outlet openings, said casing having an axial rod projecting inwardly within the re-entrant tubular portion of said first electrode.

6. An ionization chamber for monitoring the activity of a gas passing therethrough comprising a directly grounded outer casing, a first electrode and a second electrode positioned in spaced relation within said casing and insulated from each other and from the casing, a source of direct voltage, a connection from one side of said source to said first electrode, a connection from the other side of said source to ground, a high resistance, a connection from one side of said resistance to said second electrode, and a connection from the other side of said resistance to ground, said casing having inlet and outlet openings for the passage of a gas, a portion of said casing and a portion of said first electrodes having adjacent spaced surfaces forming a first gas passageway communicating at one end with said inlet opening, a portion of said first electrode and a portion of said second electrode having adjacent spaced surfaces forming a second gas passageway communicating at its one end with the other end of said first passageway and at its other end with said outlet opening.

7. An ionization chamber for monitoring the activity of a gas passing therethrough comprising a directly grounded outer casing, an electrically conducting directly grounded member extending interiorly of said casing, a first electrode and a second electrode positioned in spaced relation within said casing and insulated from each other and from the casing, a source of direct voltage, a connection from one side of said source to said first electrode, a connection from the other side of said source to ground, a high resistance, a connection from one side of said resistance to said second electrode, and a connection from the other side of said resistance to ground, said casing having inlet and outlet openings for the passage of a gas, a portion of said member and a portion of said first electrode having adjacent spaced surfaces forming a first gas passageway communicating at one end with said inlet opening, a portion of said first electrode and a portion of said second electrode having adjacent spaced surfaces forming a second gas passageway communicating at its one end with the other end of said first passageway and at its other end with said outlet opening.

8. An ionization chamber for monitoring the activity of a gas passing therethrough comprising a directly grounded outer casing, an electrically conducting member electrically and mechanically connected to said casing and extending interiorly of said casing from a central point thereon, a first electrode and a second electrode positioned in spaced relation within said casing and insulated from each other and from the casing, a source of direct voltage, a connection from one side of said source to said first electrode, a connection from the other side of said source to ground, a high resistance, a connection from one side of said resistance to said second electrode, and a connection from the other side of said resistance to ground, said casing having inlet and outlet openings for the passage of gas, a portion of said member and a portion of said first electrode having adjacent spaced surfaces forming a first gas passageway communicating at one end with said inlet opening, a portion of said first electrode and a portion of said second electrode having adjacent spaced surfaces forming a second gas passageway communicating at its one end with the other end of said first passageway and at its other end with said outlet opening.

WILLIAM RUDOLPH KANNE.

REFERENCES CITED

The following references are of record in the file of this patent:

UNITED STATES PATENTS

| Number | Name | Date |
| --- | --- | --- |
| 1,808,709 | Blake | June 2, 1931 |

OTHER REFERENCES

Bonner, article in Physical Review, June 1, 1933, pages 871 and 872 only.